(12) United States Patent
Culter et al.

(10) Patent No.: US 8,549,186 B2
(45) Date of Patent: Oct. 1, 2013

(54) SYSTEM AND METHOD FOR SHARING A DEVICE ACROSS OPERATING SYSTEMS

(75) Inventors: Bradley G. Culter, Dallas, TX (US); Mark Edward Shaw, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1836 days.

(21) Appl. No.: 11/060,720

(22) Filed: Feb. 17, 2005

(65) Prior Publication Data

US 2006/0184700 A1    Aug. 17, 2006

(51) Int. Cl.
*G06F 3/00* (2006.01)
*G06F 3/01* (2006.01)

(52) U.S. Cl.
USPC ................................. 710/8; 710/16

(58) Field of Classification Search
USPC ....................................... 710/8, 16
See application file for complete search history.

(56) References Cited

U.S. PATENT DOCUMENTS 6,128,747 A * 10/2000 Thoulon ........................ 713/330
6,611,848 B1 * 8/2003 Bradley ........................ 707/201

OTHER PUBLICATIONS

Advanced Configuration and Power Interface Specification, Oct. 11, 2002, Compaq, Intel, Microsoft, Phoenix Tech., Toshiba, Revision 2.0b, pp. 1, 13, 42, 53, 157,171, & 172.*
Advanced Configuration and Power Interface Specification, Oct. 11, 2002, Compaq, Intel, Microsoft, Phoenix Tech., Toshiba, Revision 2.0b.*
Tanenbaum, Structured Computer Organization, 1984, Prentice-Hall, Inc., 2nd Edition, 11.*
Compaq Computer Corporation, Open VMS Alpha Galaxy Guide, Jul. 8, 1999.
Hewlett-Packard Company, HP Open VMS Alpha Partitioning and Galaxy Guide, Sep. 2003.

* cited by examiner

*Primary Examiner* — Hyun Nam

(57) ABSTRACT

A system for sharing a device across a plurality of operating systems is provided. The system includes a sharable bit in the namespace for identifying whether the device is sharable. The system further includes one or more operating systems that are adapted to recognize the sharable bit.

19 Claims, 5 Drawing Sheets

SYSTEM AND METHOD FOR SHARING A DEVICE ACROSS OPERATING SYSTEMS

BACKGROUND

Embodiments of the present invention include a system and method for sharing a device across operating systems. Industry standards have been developed to enhance compatibility between devices and operating systems. One such standard is the Advanced Configuration and Power Interface Specification (ACPI) version 2.0b that was developed to establish industry standard interfaces for operating systems.

The ACPI specification describes the interfaces between components, the contents of the ACPI System Description Tables, and the related semantics of the other ACPI components. The ACPI System Description Tables describe a particular platform's hardware and are at the heart of the ACPI implementation. The ACPI System Firmware is primarily used to supply the ACPI Tables. The Firmware includes an ACPI namespace. The namespace is hierarchical in nature and is used to refer to objects. The ACPI specification is an interface specification comprised of both software and hardware elements.

Sharing of objects between OSs has been done on a very low level, and is not true sharing. Moreover, the limited sharing that does take place is typically proprietary to the specific OS and/or OS family, such as for example, OpenVMS. In an OpenVMS system, the firmware slices up the memory before the server boots. The first OS that boots builds a data structure called a global configuration tree. In this system, a kernel can access portions of the memory, however accessing the portions of memory require lock bits and locking algorithms. While such a system has a shared memory data structure that has a tree semantic, it is has a very low level of sharing and requires software and firmware that is revision locked and not separately releasable.

SUMMARY

A system for sharing a device across a plurality of operating systems is provided. The system includes a sharable bit in the namespace for identifying whether the device is sharable. The system further includes one or more operating systems that are adapted to recognize the sharable bit.

DETAILED DESCRIPTION

The following includes definitions of exemplary terms used throughout the disclosure. Both singular and plural forms of all terms fall within each meaning. Except where noted otherwise, capitalized and non-capitalized forms of all terms fall within each meaning:

As used herein, "share", "sharing", "shared", "operating system", "namespace", "object", "status object" and "firmware" are used generically and include, but are not limited to, the meanings therefore as set forth in the Advanced Configuration and Power Interface Specification, revision 2.0b, the contents of which is incorporated herein by reference.

As used herein, "device" is used generically and includes, but is not limited to, the meaning as set forth in the Advanced Configuration and Power Interface Specification, version 2.0b. The term "device" generally includes, but is not limited to, computer system memory, processors and or input/output ("I/O") devices.

As used herein, "ACPI" means the Advanced Configuration Power Interface as set forth in the ACPI Standard, revision 2.0b.

As used herein, "memory" is used generically and includes, but is not limited to, computer system memory.

As used herein, "I/O device" is used generically and includes, but is not limited to PCI controllers, PCI to PCI bridges, hard disks, CDs, DVDs, floppy disks, magnetic tapes, (such as DATs) and networking connections (such as, Ethernets or fiber channels).

Figure 1A:
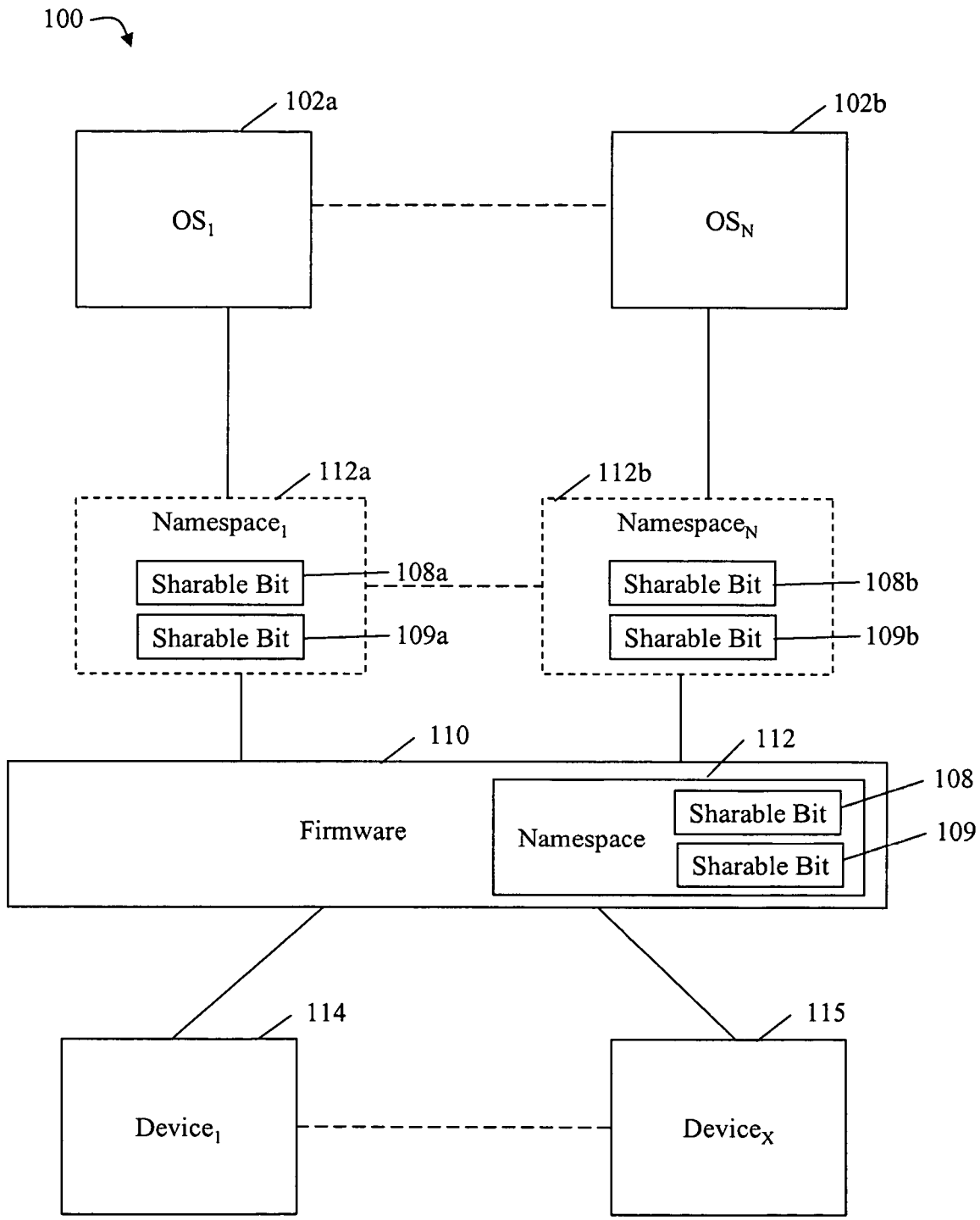
FIG. 1A is an exemplary embodiment of a system for sharing a device across a plurality of operating systems having a sharable bit in the namespace.

An exemplary system for determining whether a device is sharable across a plurality of operating systems (OSs) is provided. The plurality of OSs may be multiple instances of the same OS, or multiple versions of an OS, such as, for example, multiple instances of HP-UX. In addition, the plurality of operating systems OSs may be unrelated OSs, such as for example, LINX, HP-UX, Microsoft Windows®, OpenVMS, and any other suitable OS. Optionally, the plurality of OSs may be a combination of multiple instances of the same OS and/or unrelated OSs. FIG. 1A illustrates an exemplary system 100 having a plurality of OSs, $OS_1$ 102a through $OS_N$ 102b that are adapted to recognize whether one or more devices 114, 115 are sharable.

The exemplary system 100 further includes firmware 110 having a namespace 112. Residing in the namespace 112 is a sharable bit 108 that corresponds to $device_1$ 114, and sharable bit 109 that corresponds to $device_X$ 115. While this example illustrates two sharable bits for two devices (i.e. one sharable bit per device), it will be appreciated that the number of sharable bits will depend upon the number of devices. For Example, in a system 100 having only one device (e.g. device 114), namespace 112 may have one sharable bit (e.g., sharable bit 108). In an exemplary system including, for example, five sharable devices, the namespace may have five sharable bits.

The sharable bits 108, 109 may be any bits in the namespace 112 that can be set to indicate whether the devices 114, 115 are sharable. The sharable bit 108 may be set to 1, for example, if device 114 is sharable, or set to 0 if device 114 is not sharable. Similarly, sharable bit 109 may be set to 1 if device 115 is sharable, or set to 0 if device 115 is not sharable.

$OS_1$ 102a builds a spanning $namespace_1$ instance 112a from namespace 112 in firmware 110. Similarly, $OS_N$ 102b builds a spanning $namespace_N$ instance 112b from namespace 112. Additional information on spanning namespaces can be found in Applicants copending application Ser. No. 60/586201, "SYSTEM AND METHOD FOR SOFT PARTITIONING A COMPUTER SYSTEM" filed Jan. 20, 2005, which is incorporated herein by reference. The spanning $namespace_1$ 112a includes a sharable bit 108a, and sharable bit 109a. The spanning namespace 112a is a copy, or active simulacrum, of the core namespace 112 that resides in the firmware 110. As used herein, a "simulacrum" includes, but is not limited to, an image, representation, or semblance. The spanning namespace contains the same objects but the objects may exhibit different (per fPar) behavior. Thus, the spanning namespace 112a need not to be an exact copy of namespace 112, and often times is not an exact copy. For example, each operating system may observe CPU 0 in its spanning namespace having the "present" and "functioning" bits set, but only one spanning namespace may observe that the "enable" bit is set. Sharable bit 108a is a copy of sharable bit 108 in that if, for example, sharable bit 108 is set to 1, i.e. device 114 is sharable, sharable bit 108a is also set to 1. Thus, $OS_1$ 102a can determine that $device_1$ 114 is sharable by examining sharable bit 108a. Similarly, sharable bit 109a is a copy of sharable bit 109 in that if sharable bit 109 is set to 0, i.e. $device_X$ 115 is not sharable, sharable bit 109a is also set to 0. In this example, $OS_1$ 102a is adapted to determine whether $device_X$ 115 is sharable by examining sharable bit 109a. The term sharable bit is referred to throughout in the singular form, however, the sharable bit may be one or more bits.

Figure 1B:
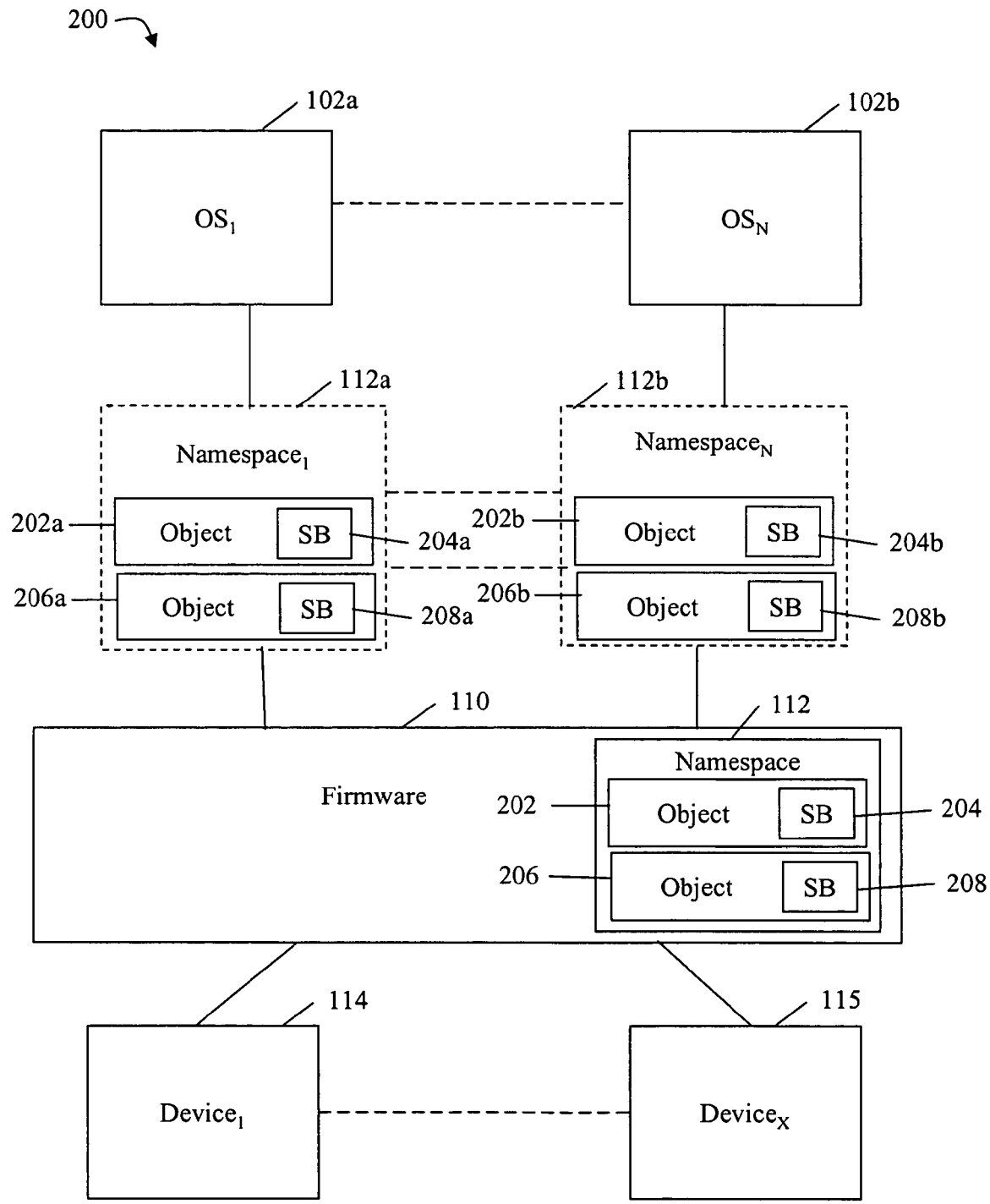
FIG. 1B is an exemplary embodiment of a system for sharing a device across a plurality of operating systems having a sharable bit in an object in the namespace.

FIG. 1B illustrates another exemplary embodiment of a system 200 for determining whether a device is sharable. The exemplary system 200 is similar to the exemplary embodiment illustrated in FIG. 1A. The system 200 includes a plurality of OSs, 102a, 102b, one or more devices 114, 115, firmware 110 and namespace 112. Namespace 112 includes object 202, and object 206. Typically, each device has one or more objects associated with it. In this example there are two objects that are associated with two devices, similarly if there were five devices there would be at least five objects associated with those five devices. The objects may be any object, such as, for example, a status object. A "status object" includes, but is not limited to, any object whose properties indicate the status of one or more devices associated with the object. Hereinafter, a status object shall be referred to as a "_STA object" in accordance with the ACPI standard. One embodiment of a status object (i.e., "_STA object") is described in more detail below. Optionally, the object could be an AUX object that is defined to hold these new status bits. OSs that do not understand what to do with AUX object would simply ignore these objects and their status bits. Object 202 includes a sharable bit 204. Similarly, object 206 includes a sharable bit 208. As described above, $OS_1$ 102a builds $spanning\ namespace_1$ 112a from namespace 112 in firmware 110. In this example, $spanning\ namespace_1$ 112a includes objects 202a, 206a. Objects 202a, 206a include sharable bits 204a, 208a that may be set in the firmware to indicate whether or not devices 114, 115 are shareable. Similarly, $OS_N$ 102b builds $spanning\ namespace_N$ 112b having objects 202b, 206b that include sharable bits 204b, 208b. Similarly, these sharable bits 204b, 208b may be set so that $OS_N$ 102b can determine whether or not the devices 114, 115 are sharable.

Figure 2:
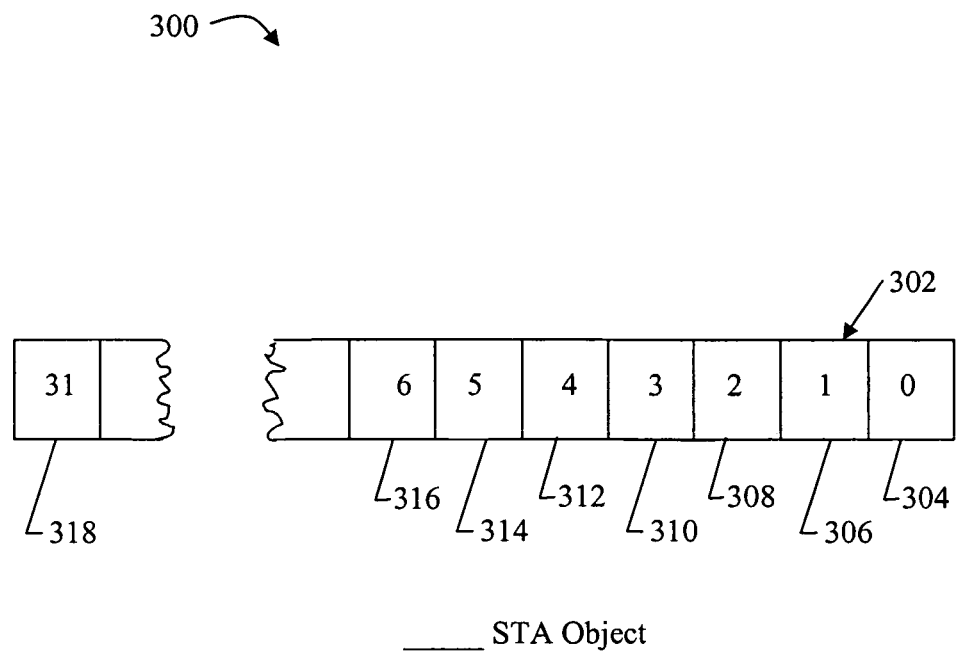
FIG. 2 is an exemplary embodiment of a bit map of a _STA object.

Illustrated in FIG. 2 is an exemplary embodiment of a bit map 302 for _STA object 300. The ACPI specification 2.0b, which is incorporated by reference herein, provides a bitmap for the _STA object 300. Under the ACPI standard, bit 0 304 is set if the device is present. Bit 1 306 is set if the device is enabled and decoding its resources. Bit 2 308 is set if the device should be shown in the UI. Bit 3 310 is set if the device is functioning properly and bit 4 312 is set if the battery is present. The ACPI specification reserves bits 5 314 through 31 318.

In one embodiment, bit 5 314 is utilized as the sharable bit. The OSs are adapted to examine bit 5 314 in the _STA status object to determine if the device associated with the object is sharable. A 1 in bit 5 314, for example, may indicate that the device is sharable and a 0 in bit 5 314 may indicate that the device is not sharable. Similarly, other bits, namely bits 6-31 that have been reserved by ASPI, may be used to determine whether a device is sharable. Operating systems that have not been modified to examine the sharable bit in the _STA status object may simply ignore the bit status, allowing status objects to be modified to accommodate OSs that recognize sharable bits without interfering with OSs that do not recognize sharable bits.

Other attributes of the devices 114, 115, such as, for example, "the device is running too warm or too cold", or "the device is drawing more current then it should be" may be described using other reserved bits, such as, for example bits 6 thru 31.

Figure 3:
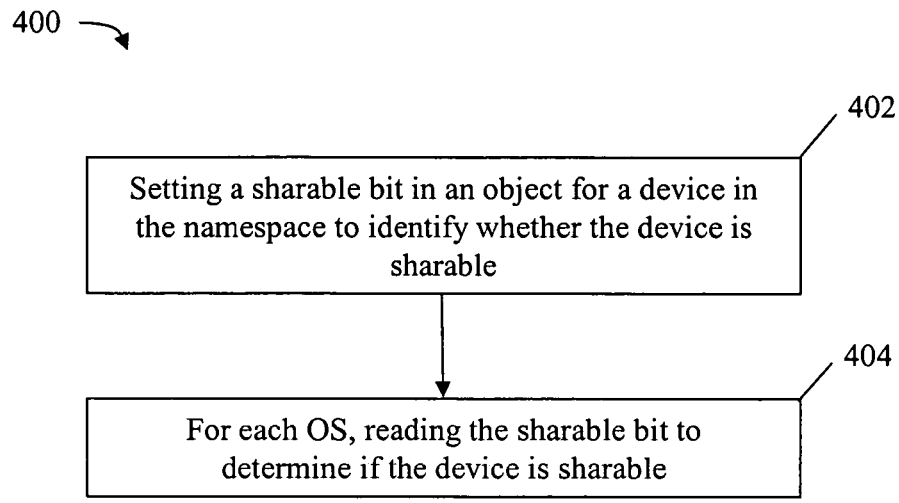
FIG. 3 is an exemplary methodology of a determining whether a device is sharable.

Illustrated in FIG. 3 is an exemplary methodology 400 for determining whether a device is sharable. As illustrated, the blocks represent functions, actions and/or events performed therein. It will be appreciated that electronic and software applications involve dynamic and flexible processes such that the illustrated blocks can be performed in other sequences different than the one shown. Elements embodied as software may be implemented using various programming approaches such as machine language, procedural, object oriented or artificial intelligence techniques. In addition, if desired and appropriate, some or all of the software can be embodied as part of a device's operating system.

The exemplary methodology 400 for determining whether a device is sharable includes setting a sharable bit for a device at block 402. The status of the sharable bit is indicative of whether the device is sharable. The sharable bit is set in a namespace in the firmware. The sharable bit may be set in an object in the namespace, such as, for example, a status object, or the _STA object. Setting the sharable bit may include, for example, setting bit 5 of the _STA object to a 1 to indicate that the device is sharable, or for example, setting bit 5 of the _STA object to 0 to indicate that the device is not sharable. At block 404 the sharable bit is read by one or more OSs. The OSs are adapted to examine the sharable bit to determine if the device is sharable. If, for example, the shareable bit is set to 1, the OS determines that the device is sharable. If the sharable bit is set to 0, for example, the OS determines that the device is not sharable.

Figure 4:
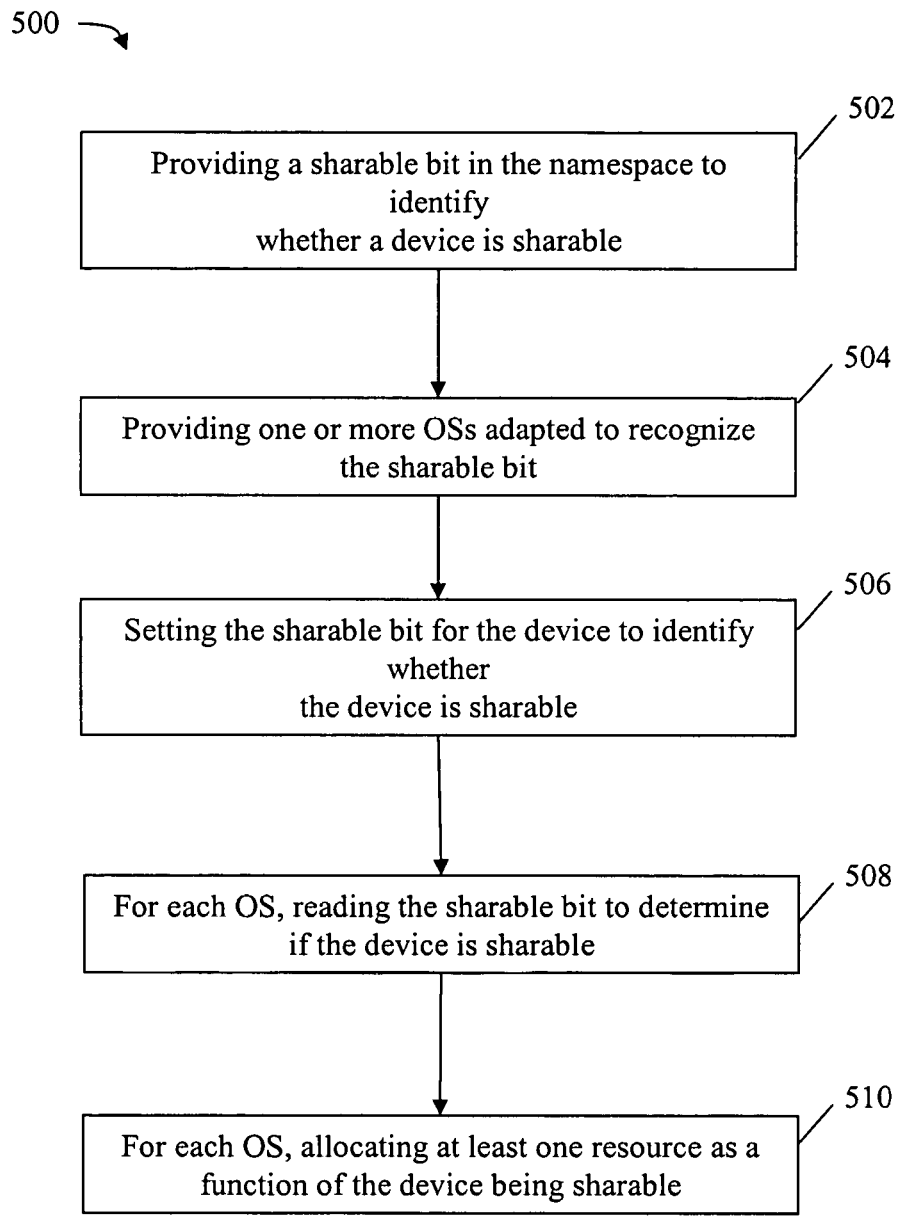
FIG. 4 is an exemplary methodology of sharing a sharable device across a plurality of operating systems.

FIG. 4 illustrates an exemplary methodology 500 for sharing a device across a plurality of operating systems. At block 502 a sharable bit is provided in namespace. The sharable bit may be provided in an object in the namespace, such as, a status object or, for example, the _STA object. The status of the sharable bit identifies whether a device is sharable. At block 504 one or more OSs that have been adapted to recognize, or examine, the sharable bit are provided. The sharable bit for the device is set at block 506. Setting the sharable bit identifies whether the device is sharable or whether the device is not sharable. Setting the sharable bit to 1, for example, may indicate that the device is sharable, while setting the sharable bit to 0 may indicate that the device is not sharable. At block 508 the one or more OSs examine or read the sharable bit to determine if the device is sharable. If the OSs determine the sharable bit is set at 1, for example, the OSs determine that the device is sharable. At block 510 the one or more OSs allocate at least one resource as a function of the device being sharable. As noted above, the sharable bit may be a single bit or one or more bits.

Optionally additional bits, such as, bits 6 thru 31 of the _STA object that are reserved in the ACPI specification, for example, may be used to identify additional attributes of the shared device. In this optional methodology, one or more additional bits are provided in the namespace to identify additional attributes of a sharable device. An OS is adapted to recognize the one or more additional bits in the namespace. The one or more additional bits may be set to indicate additional attributes of the device. Setting one or more additional bits to 1, for example, may indicate that the device has a particular attribute. The OS reads the additional bit, and determines whether or not the sharable device has those additional attributes.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, additional reserved bits in the _STA object can be used to identify additional features for the sharable devices. Therefore, the invention, in its broader aspects, is not limited to the specific details, the representative apparatus, and illustrative examples shown and described. Accordingly, departures may be made from such details without departing from the spirit or scope of the applicant's general inventive concept.

The invention claimed is:

1. A system for sharing a device, comprising:
    at least first and second operating systems;
    at least one sharable bit in a firmware namespace for identifying whether the device is sharable; and
    at least first and second spanning namespaces respectively assigned to the first and second operating systems and wherein each spanning namespace comprises a copy of the at least one sharable bit.

2. The system of claim 1 wherein the firmware namespace includes a status object and the at least one sharable bit is included in the status object.

3. The system of claim 2 wherein the status object relates to the shared device.

4. The system of claim 2 wherein the at least one sharable bit is located within one or more bits of the status object that comprise a reserved status.

5. The system of claim 2 wherein the at least one sharable bit consists of one bit.

6. The system of claim 1 wherein the device is memory.

7. The system of claim 1 wherein the device is a processor.

8. The system of claim 1 wherein the device is an I/O device.

9. The system of claim 1, further comprising:
    at least one bit in the firmware namespace for defining at least one attribute of the shared device.

10. The system of claim 9, the firmware namespace including a status object having a plurality of reserved bits, wherein the at least one attribute defining bit is located in the reserved bits.

11. A method for sharing a device comprising the steps of:
    setting at least one bit in an object for the device in a firmware namespace to identify whether the device is sharable;
    generating at least first and second spanning namespaces respectively assigned to first and second operating systems;
    storing a copy of the at least one bit in the first and second spanning namespaces; and
    for each operating system, reading the copied bit from a corresponding spanning namespace to determine whether the device is sharable.

12. The method of claim 11, further comprising the step of:
    sharing the device among at least one operating system if the device is identified as being sharable.

13. The method of claim 11, wherein the step of setting at least one bit includes setting a single bit to identify whether the device is sharable.

14. The method of claim 13, wherein the step of setting the single bit includes setting the single bit in a status object for the device in the firmware namespace.

15. The method of claim 14, wherein the step of setting the single bit includes setting a bit recognized as a reserved bit.

16. The method of claim 11 further including the step of:
    setting at least one bit in the object for the device to identify at least one attribute of the device.

17. A method for identifying whether a device is sharable across a plurality of operating systems, comprising the steps of:
    providing a sharable bit in a firmware namespace for identifying whether the device is sharable;
    setting the sharable bit for the device to identify whether the device is sharable;
    copying the sharable bit into separate spanning namespaces, each spanning namespace corresponding to one of a plurality of operating systems; and
    for each operating system, reading the sharable bit from its corresponding spanning namespace to determine if the device is sharable.

18. The method of claim 17, further including the step of:
    for each operating system, allocating at least one resource based upon the shared device.

19. The method of claim 17, further including the step of:
    providing at least one bit in the firmware namespace to identify at least one attribute of the device.

* * * * *